(12) United States Patent
Wilhelm et al.

(10) Patent No.: US 8,615,990 B2
(45) Date of Patent: Dec. 31, 2013

(54) APPARATUS, SYSTEM, AND METHOD FOR CONTROLLING MULTIPLE DIESEL PARTICULATE FILTERS

(75) Inventors: Daniel D. Wilhelm, Nashville, IN (US); Balbahadur Singh, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 496 days.

(21) Appl. No.: 12/861,961

(22) Filed: Aug. 24, 2010

(65) Prior Publication Data
US 2011/0047973 A1 Mar. 3, 2011

Related U.S. Application Data

(60) Provisional application No. 61/236,469, filed on Aug. 24, 2009.

(51) Int. Cl.
*F01N 3/00* (2006.01)
*F01N 3/023* (2006.01)
*F01N 9/00* (2006.01)

(52) U.S. Cl.
USPC .................. 60/295; 60/285; 60/286

(58) Field of Classification Search
USPC .......................... 60/295, 285, 286
See application file for complete search history.

(56) References Cited

U.S. PATENT DOCUMENTS

| | | | |
|---|---|---|---|
| 4,945,722 A * | 8/1990 | Goerlich | 60/295 |
| 6,834,496 B2 * | 12/2004 | Nakatani et al. | 60/274 |
| 2006/0059896 A1 | 3/2006 | Liu et al. | |
| 2007/0006574 A1 * | 1/2007 | Nakano | 60/285 |

FOREIGN PATENT DOCUMENTS

| | | |
|---|---|---|
| JP | 06-330735 A | 11/1994 |
| JP | 2003-193828 A | 7/2003 |

OTHER PUBLICATIONS

PCT/US2010/046430, International Search Report and Written Opinion, May 30, 2011.

* cited by examiner

*Primary Examiner* — Thomas Denion
*Assistant Examiner* — Brandon Lee
(74) *Attorney, Agent, or Firm* — Foley & Lardner LLP

(57) ABSTRACT

According to one embodiment, an apparatus for controlling regeneration events on multiple diesel particulate filters (DPFs) of an exhaust after-treatment system includes a regeneration event synchronization module and regeneration event termination module. The regeneration event synchronization module is configured to simultaneously initiate a regeneration event on a first DPF and a regeneration event on a second DPF in response to a regeneration event request being triggered for one of the first and second DPFs. The regeneration event termination module is configured to terminate the regeneration event on the first DPF and the regeneration event on the second DPF. Under normal operating conditions, the termination of the regeneration event on the first DPF is performed independently of the termination of the regeneration event on the second DPF.

18 Claims, 3 Drawing Sheets

APPARATUS, SYSTEM, AND METHOD FOR CONTROLLING MULTIPLE DIESEL PARTICULATE FILTERS

CROSS-REFERENCE TO RELATED APPLICATION

This application claims the benefit of U.S. Provisional Patent Application No. 61/236,469, filed Aug. 24, 2009, which is incorporated herein by reference.

FIELD

The subject matter disclosed herein relates to exhaust gas after-treatment systems, and more particularly to exhaust gas after-treatment systems with multiple exhaust filters.

SUMMARY

The subject matter of the present application has been developed in response to the present state of the art, and in particular, in response to the problems and needs in the art that have not yet been fully solved by currently available control systems for controlling multiple diesel particulate filters (DPF). Accordingly, the subject matter of the present application has been developed to provide an apparatus, system, and method that overcomes at least some of the shortcomings of the prior art.

Described herein are various embodiments of an apparatus, system, and method for controlling the regeneration of DPFs in an internal combustion engine system having multiple DPFs. According to some embodiments, the apparatus, system, and method provide a control strategy that synchronizes regeneration events on the DPFs. More specifically, in certain implementations, the control strategy includes simultaneously initiating regeneration events on each of the multiple DPFs and ending the respective regeneration events independent of each other. Generally, each regeneration event ends according to the particulate matter load (e.g., soot load) within the corresponding DPF. According to certain embodiments, the control strategy of the described herein accomplishes at least one of the following advantages: reduction of the thermal management of the internal combustion engine, reduction of the elevated outlet temperatures of the DPFs, reduction of the dosing fuel necessary for regeneration events, prevention of the overloading of DPFs, prevention of the overcleaning of DPFs, and reduction of the backpressure discrepancies between DPFs for internal combustion engine systems having multiple DPFs.

According to one embodiment, an apparatus for controlling regeneration events on multiple diesel particulate filters (DPFs) of an exhaust after-treatment system includes a regeneration event synchronization module and regeneration event termination module. The regeneration event synchronization module is configured to simultaneously initiate a regeneration event on a first DPF and a regeneration event on a second DPF in response to a regeneration event request being triggered for one of the first and second DPFs. The regeneration event termination module is configured to terminate the regeneration event on the first DPF and the regeneration event on the second DPF. Under normal operating conditions, the termination of the regeneration event on the first DPF is performed independently of the termination of the regeneration event on the second DPF. In certain implementations, termination of the regeneration event on the first DPF is performed at a different time than the termination of the regeneration event on the second DPF.

According to some implementations, the regeneration event synchronization module is configured to control the parameters of the regeneration event on the first DPF independently of the parameters of the regeneration event on the second DPF. The parameters of the regeneration event on the first DPF can be different than the parameters of the regeneration event on the second DPF. Also, the parameters of the regeneration events on the first and second DPFs can include exhaust gas regeneration temperature.

In certain implementations, the apparatus also includes a particulate matter loading module that is configured to estimate a first amount of particulate matter on the first DPF and a second amount of particulate matter on the second DPF. The particulate matter loading module triggers a regeneration event request for the first DPF if the first amount of particulate matter on the first DPF is above a first threshold and triggers a regeneration event request for the second DPF if the second amount of particulate matter on the second DPF is above a second threshold.

In some implementations of the apparatus, the regeneration event termination module is further configured to terminate the regeneration event on the first DPF substantially simultaneously with the termination of the second DPF under abnormal operating conditions.

In another embodiment, an exhaust after-treatment system coupleable to an engine includes at least first and second branches each communicable in exhaust receiving communication with an engine. The first branch includes a first DPF and the second branch includes a second DPF. The first and second branches can be schematically or physically parallel to each other. Under normal operating conditions, the start of regeneration events on the first and second DPFs is synchronized and the termination of regeneration events on the first and second DPFs are not synchronized.

In some implementations, the system further includes a single exhaust line communicable in exhaust receiving communication with the engine. In such implementations, the first and second branch can be communicable in exhaust receiving communication with the single exhaust line via an exhaust distributor.

In yet some implementations, system may includes at least two exhaust lines each communicable in exhaust receiving communication with the engine. In such implementations, the first and second branches can be communicable in exhaust receiving communication with a respective one of the at least two exhaust lines.

According to certain implementations, the system includes at least first and second reactant dosers each configured to supply reactant to exhaust gas in a respective one of the first and second branches. The first and second reactant dosers can be independently controllable relative to each other.

In certain implementations of the system, the synchronized start of regeneration events on the first and second DPFs is triggered when an estimated particulate load on just one of the first and second DPFs exceeds a threshold regardless of the particulate load on the other of the first and second DPFs.

According to yet another embodiment, a method for controlling regeneration events includes simultaneously initiating respective regeneration events on at least two diesel particulate DPFs in response to a regeneration event request being triggered for one of the at least two DPFs. The method also includes terminating the regeneration event on one of the at least two DPFs independently of the termination of the regeneration event on the other of the at least two DPFs under normal operating conditions.

In certain implementations, the method includes implementing a regeneration strategy for a first of the DPFs. Implementation of the regeneration strategy for the first DPF either triggers a regeneration event request for regeneration of the first DPF or does not trigger a regeneration event request for regeneration of the first DPF. The method may also include implementing a regeneration strategy for a second of the DPFs. Implementation of the regeneration strategy for the second DPF either triggers a regeneration event request for regeneration of the second DPF or does not trigger a regeneration event request for regeneration of the second DPF. The regeneration strategy for the second DPF is implemented only if the regeneration strategy implemented for the first DPF does not trigger a regeneration event request for regeneration of the first DPF.

In some implementations, the method includes determining particulate matter loads on each of the at least two DPFs following initiation of the regeneration events. The method includes stopping the regeneration event on a first of the at least two DPFs and continuing the regeneration event on a second of the at least two DPFs if the particulate matter load on the first DPF is below a first threshold and the particulate matter load on the second DPF is above a second threshold. In contrast, the method includes stopping the regeneration event on a second DPF and continuing the regeneration event on the first DPF if the particulate matter load on the second DPF is below the second threshold and the particulate matter load on the first DPF is above the first threshold.

According to certain implementations, the method may include terminating the regeneration event on a first of the at least two DPFs substantially simultaneously with the termination of a second of the at least two DPFs under abnormal operating conditions. The abnormal operating conditions may include at least one faulty condition associated with the regeneration event on the second DPF where the regeneration event on the second DPF is terminated in view of the at least one faulty condition.

In some implementations, the method includes controlling the exhaust gas temperature during regeneration events on the at least two DPFs following initiation of the regeneration events. Control of the exhaust gas temperature for the regeneration event on a first of the at least two DPFs can be independent of the control of the exhaust gas temperature for the regeneration event on a second of the at least two DPFs. In certain implementations, independent control of the exhaust gas temperature includes independent control of at least two reactant dosers each communicable in reactant supplying communication with exhaust gas upstream of a respective one of the DPFs. According to some implementations, independent control of the exhaust gas temperature includes independent control of flow rates of exhaust gas through respective exhaust lines each comprising a respective one of the at least two DPFs. The exhaust gas temperature for regeneration of the first DPF can be different than the exhaust gas temperature for regeneration of the second DPF.

Reference throughout this specification to features, advantages, or similar language does not imply that all of the features and advantages that may be realized with the present disclosure should be or are in any single embodiment or implementation of the disclosure. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, advantages, and characteristics of the subject matter of the present disclosure may be combined in any suitable manner in one or more embodiments and/or implementations. One skilled in the relevant art will recognize that the subject matter of the present disclosure may be practiced without one or more of the specific features or advantages of a particular embodiment or implementation. In other instances, additional features and advantages may be recognized in certain embodiments and/or implementations that may not be present in all embodiments or implementations. These features and advantages will become more fully apparent from the following description and appended claims, or may be learned by the practice of the subject matter of the present disclosure as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter of the present disclosure and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, or characteristics of the disclosure may be combined in any suitable manner in one or more embodiments. In the following description, numerous specific details are provided to impart a thorough understanding of embodiments of the subject matter of the disclosure. One skilled in the relevant art will recognize, however, that the subject matter of the present disclosure may be practiced without one or more of the specific details, or with other methods, components, materials, and so forth. In other instances, well-known structures, materials, or operations are not shown or described in detail to avoid obscuring aspects of the disclosure.

Figure 1:
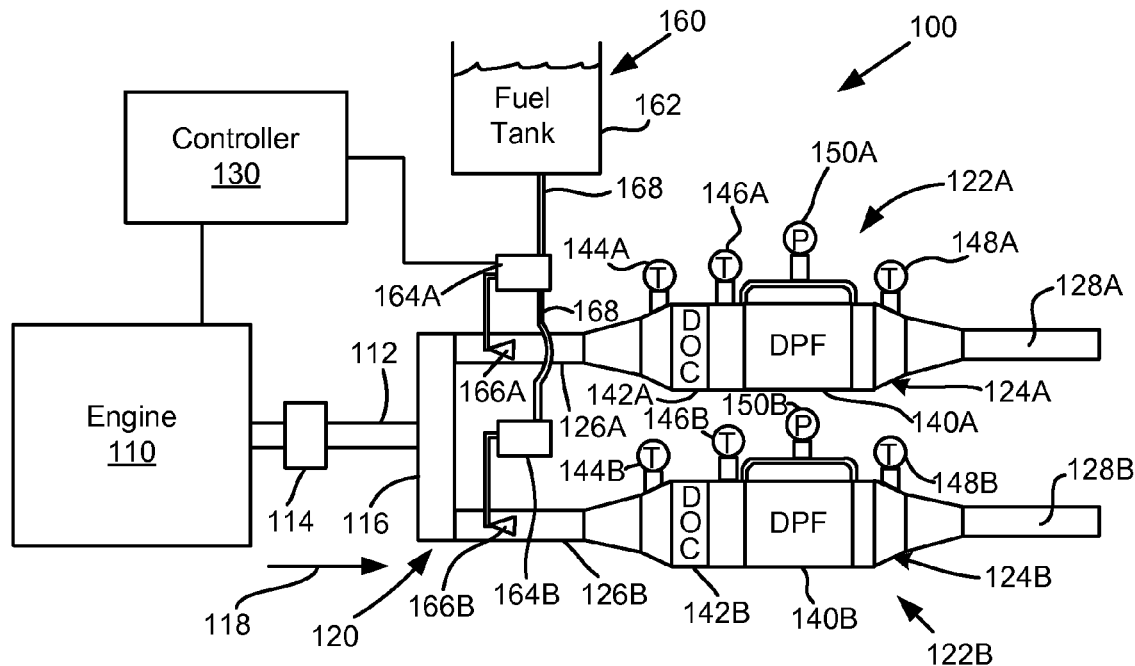
FIG. 1 is a schematic block diagram of an internal combustion engine system having an exhaust after-treatment system with a single exhaust line and multiple DPFs according to one representative embodiment.

Referring to FIG. 1, one embodiment of an internal combustion engine system 100 is depicted. The main components of the engine system 100 include an internal combustion engine 110, an exhaust gas after-treatment system 120 coupled to the engine, and a controller 130 in electronic communication with the engine 110 and after-treatment system 120.

The internal combustion engine 110 can be a compression ignited internal combustion engine, such as a diesel fueled engine, or a spark-ignited internal combustion engine, such as a gasoline fueled engine operated lean. Within the internal combustion engine 110, air from the atmosphere is combined with fuel to power the engine. Combustion of the fuel and air produces exhaust gas that is operatively vented to an exhaust manifold. From the exhaust manifold, at least a portion of the generated exhaust gas flows through a single exhaust line 112 into the exhaust gas after-treatment system 120 in a direction indicated by directional arrow 118. The engine system 100 may also include a turbocharger 114 operatively coupled to the single exhaust line 112. Exhaust flowing through the single exhaust line 112 may power a turbine of the turbocharger 114, which drives a compressor (not shown) of the turbocharger for compressing engine intake air.

Prior to entering the after-treatment system 120, exhaust gas from the exhaust line 112 enters a secondary exhaust manifold or distributor 116. The secondary manifold 116 is configured to receive exhaust gas from a single exhaust line and distribute the exhaust gas to two separate lines, such as first and second after-treatment system inlets 126A, 126B. In some embodiments, the secondary manifold 116 evenly distributes exhaust gas into the inlets 126A, 126B. For example, the engine system 100 can be configured such that an equal amount of particulate matter in the exhaust gas is split between the branches 122A, 122B. In other embodiments, the secondary manifold 116 may unevenly distribute exhaust gas into the inlets 126A, 126B based on any of various factors, such as the size, shape, capacity, and condition of components in the exhaust gas after-treatment system. In certain implementations, the secondary manifold 116 may include a flow regulation valve configured to selectively regulate the flow rate of exhaust gas into the multiple inlets 126A, 126B of the exhaust after-treatment system 120.

Generally, the exhaust gas after-treatment system 120 is configured to reduce the number of pollutants contained in the exhaust gas generated by the engine 110 before venting the exhaust gas into the atmosphere. The exhaust gas after-treatment system 120 includes multiple after-treatment branches or legs 122A, 122B arranged in a parallel or staggered configuration. In the illustrated embodiment, the branches 122A, 122B are identically configured with matching components. However, in other embodiments, the branches 122A, 122B are not identically configured. For example, the branches 122A, 122B may have different components or the same components with different specifications, such as size, shape, and capacity. Additionally, although the illustrated embodiment shows a single exhaust line 116 and secondary distributor 116 coupled to a pair, i.e., two, branches 122, in other embodiments, the system can include more than two branches 122 coupled to the single exhaust line and distributor.

In the illustrated embodiment, the branch 122A includes the same features as the branch 122B with like numbers referring to like elements. More specifically, the matching features of the branches 122A, 122B are labeled with the same reference numbers but with the suffix "A" to indicate association with the branch 122A and the suffix "B" to indicate association with the branch 122B. Unless otherwise noted, the description will proceed with reference to the features of the branch 122A, from which details of the features of the branch 122B also will be understood.

As exemplary of one particular embodiment, the branch 122A includes an after-treatment component assembly 124A including a DPF 140A and a diesel oxidation catalyst (DOC) 142A. In the illustrated embodiment, the DOC 142A is positioned upstream of the DPF 140A, but can be positioned downstream of the DPF in other embodiments if desired. The assembly 124A is in exhaust receiving communication with the after-treatment system inlet 126A, which includes an exhaust conduit, and exhaust providing communication with an exhaust after-treatment system outlet 128A, which includes an exhaust conduit. Although not shown, the after-treatment assembly 124A can include additional components, such as additional DOCs or DPFs, or one or more selective catalytic reduction (SCR) catalysts and ammonia oxidation (AMOX) catalysts. Alternatively, one or more exhaust after-treatment components can be positioned downstream of the after-treatment component assembly 124A in exhaust receiving communication with the exhaust outlet 128A.

The exhaust after-treatment system 120 also includes a reactant delivery system 160 for introducing a hydrocarbon reactant, such as fuel, into the exhaust gas prior to passing through the DOC 142A. Generally, the reactant may facilitate oxidation of various chemical compounds adsorbed within the DOC 142A and may also facilitate regeneration of the DPF 140A. The reactant delivery system 160 includes a fuel tank 162, a fuel pump 164A, and a fuel delivery mechanism 166A, such as a nozzle or injector. Under the direction of the controller 130, the fuel pump 164A pumps fuel from the fuel tank 162 to the delivery mechanism 166A. The delivery mechanism 166A is operatively coupled to the inlet 126A in fuel supplying communication with exhaust flowing through the inlet. The fuel tank 162 supplies fuel to the fuel pump 164A via a fuel supply line 168. The fuel supply line 168 can also extend to the fuel pump 164B of the second branch 122B as shown, or a separate fuel supply line can be used. The reactant pump 164A, reactant delivery mechanism 166A, and exhaust flow rate through the branch 122A, in certain embodiments, may be directed by the controller 130 to create an environment conducive to oxidation of chemical compounds on the DOC 142A and regeneration of the DPF 140A.

Alternative, or in addition, to a reactant delivery system 160, the controller 130 can be configured to implement a fuel injection timing strategy for injecting fuel into the combustion chambers of the engine 110 that results in excess unburned fuel in the exhaust gas exiting the engine 110. The unburned fuel acts much in the same way as fuel injected into the exhaust gas via the reactant delivery system 160 to provide an environment conducive to oxidation and regeneration.

The first branch 122A of the exhaust after-treatment system 120 shown includes one DOC 142A and one DPF 140A, positioned in specific locations relative to each other along the exhaust flow path. However, in other embodiments, the exhaust after-treatment system may include more than one of any of the various catalysts positioned in any of various positions relative to each other along the exhaust flow path as desired.

The exhaust after-treatment system 120 also includes various sensors, such as exhaust temperature sensors 144A, 146A, 148A, and differential pressure sensor 150A. The various sensors may be strategically disposed throughout the engine system 100 and may be in communication with the controller 130 to monitor operating conditions. The illustrated temperature sensors include the DOC inlet exhaust temperature sensor 144A, DOC outlet and DPF inlet exhaust temperature sensor 146A, and DPF outlet exhaust temperature sensor 148A. The differential pressure sensor 150A includes two pressure sensors or probes positioned at the DPF inlet and outlet, respectively. The differential pressure sensor 150A receives input from the two pressure sensors and calculates a pressure difference between the inlet and outlet of the DPF. Although only temperature and pressure sensors are shown in the illustrated embodiment, other sensors may be used as desired without departing from the spirit of the present disclosure. For example, the system 100 may include exhaust properties sensors for detecting the mass concentrations of various components in the exhaust gas, such as $NO_x$, oxygen, nitrogen, and the like, which can be used to calculate the amount of particulate matter accumulated on the DPFs in certain implementations.

Figure 2:
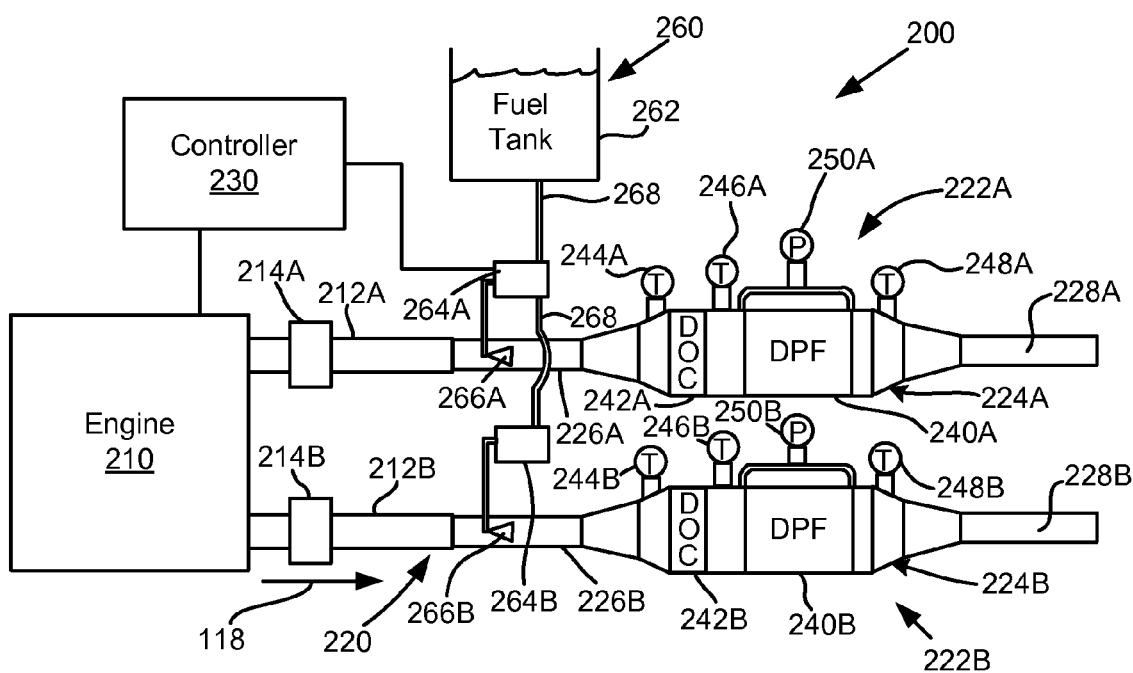
FIG. 2 is a schematic block diagram of an internal combustion engine system having an exhaust after-treatment system with multiple exhaust lines and multiple DPFs according to one representative embodiment.

FIG. 2 depicts one embodiment of an internal combustion engine system 200 similar to the engine system 100 of FIG. 1. Like the internal combustion engine system 100, the engine system 200 includes multiple after-treatment branches 222A, 222B each with a separate DPF 240A, 240B, respectively. However, unlike the engine system 100, the engine system 200 includes two separate exhaust lines 212A, 212B each in exhaust providing communication with a respective branch 222A, 222B. Accordingly, the engine system 200 does not include a secondary manifold 116 to split a single exhaust flow into dual exhaust flows. Rather, exhaust gas generated by the engine 210 exits the engine (e.g., a primary exhaust manifold of the engine) as two separate exhaust flows lines. The relative exhaust flow rates through the separate exhaust lines 212A, 212B can be regulated by any of various techniques, such as using a flow regulation valve within a primary exhaust manifold (not shown) of the engine 210. The engine system 200 also includes two turbochargers 214A, 214B each coupled to a respective one of the exhaust lines 212A, 212B. Other features of the engine system 200 are the same as or similar to the corresponding features of the engine system 100, with like numbers referring to like elements. More specifically, the features of the engine system 200 that are similar to features of the engine system 100 are labeled with the same reference numbers but in a 200-series instead of the 100-series as used with engine system 100.

Although the internal combustion engine systems 100, 200 of FIGS. 1 and 2 each show two exhaust after-treatment branches each with a single DPF, in other embodiments, the internal combustion engine systems can include more exhaust after-treatment branches each with one or more DPFs without departing from the essence of the present disclosure. For example, in some implementations associated with larger engines, more than two exhaust after-treatment branches may be required to sufficiently meet emissions regulations. Accordingly, in some embodiments, the engine systems 100, 200 of FIGS. 1 and 2 can have any number of branches 122, 222 and DPFs 140, 240. In the case of engine system 100, the system can have any number of pairs of branches 122 with each pair being coupled to respective single exhaust lines 112, turbochargers 114, and secondary distributors 116. Regarding engine system 200, the system can have any number of branches 222 with each branch being coupled to respective exhaust lines 212 and turbochargers 214. The same operation and control of engine systems having two exhaust after-treatment branches, as will be described below in more detail, can be applied to engine systems having more than two exhaust after-treatment branches in view of the teachings herein.

Figure 3:
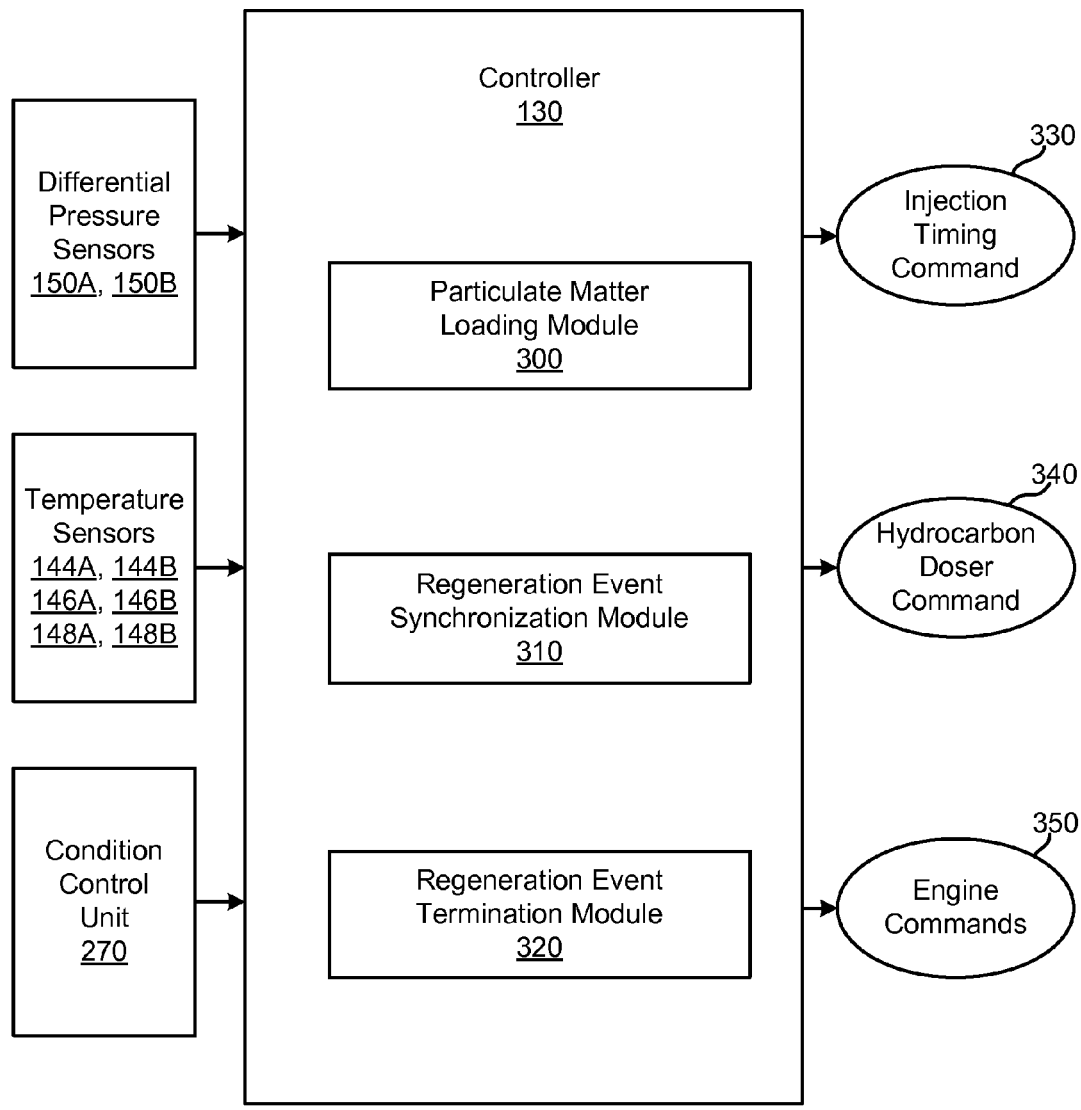
FIG. 3 is a schematic block diagram of a controller of an internal combustion engine system according to one representative embodiment.

Generally, the controller 130 controls the operation of the engine system 100 and associated sub-systems, such as the engine 110 and exhaust gas after-treatment system 120. The controller 130 is depicted in FIGS. 1-3 as a single physical unit, but can include two or more physically separated units or components in some embodiments if desired. For example, in certain implementations, each exhaust after-treatment branch (e.g., DPF) can be controlled by a separate controller. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 100 to control the system to achieve desired results, and more specifically, achieve desired exhaust gas emissions.

Referring to FIG. 3, according to one embodiment, the controller 130 includes a particulate matter loading module 300, regeneration event synchronization module 310, and regeneration event termination module 320.

The particulate matter loading module 300 is configured to determine a condition of particulate matter loading on each of the DPFs 140A, 140B. For example, the particulate matter loading module 300 may be configured to determine a first particulate matter load estimate for the first DPF 140A, and a second particulate matter load estimate for the second DPF 140B. The particulate matter loading module 300 can use any of various methods and techniques for determining the particulate matter loads associated with the DPFs 140A, 140B. For example, in certain implementations, the controller 130 receives input from the differential pressure sensors 150A, 150B indicating a pressure difference across a respective DPF 140A, 140B. Additionally, the controller 130 may receive other input regarding any of various conditions of the engine system 100, such as exhaust flow rates and exhaust component mass concentrations, from a condition control unit 270. Based on the input from the differential pressure sensors 150A, 150B, the respective exhaust gas flow rates through the DPFs 140A, 140B, and/or the component mass concentrations, the particulate matter loading module 300 can determine the respective particulate matter load estimates for each DPF 140A, 140B.

The regeneration event synchronization module 310 of the controller 130 is configured to synchronize regeneration events on the DPFs 140A, 140B. In representative embodiments, the regeneration event synchronization module 310 achieves synchronization of regeneration events on the DPFs 140A, 140B by initializing or starting regeneration events on the DPFs at the same time even if regeneration of one of the DPFs is not necessary.

A regeneration event on a DPF can be triggered in any of various ways. For example, in some implementations, a regeneration event can be triggered or requested based on a particulate matter load estimate determined by the particulate matter loading module 300. More specifically, a particulate matter load estimate may indicate that a sufficient amount of particulate matter has accumulated on a DPF (e.g., the particulate matter load estimate exceeds a predetermined threshold) to warrant a regeneration event. Alternatively, or additionally, in certain embodiments, the regeneration event synchronization module 310 may be configured to trigger a regeneration event on one of the DPFs 140A, 140B that does not coincide with an estimated amount of particulate matter on the DPF. For example, a regeneration event can be triggered based on other factors as is known in the art. Other factors can include engine operating conditions, vehicle driving conditions, driving patterns, environmental conditions, and predetermined regeneration schedules. In certain situations, triggering regeneration events independent of particulate matter loads may result in regeneration events occurring before or after the loads reach high levels. Nevertheless, appropriate expediting or delaying of regeneration events may contribute to an increase in the fuel economy of a vehicle, extended life expectancy of a particulate filter, and increased overall efficiency of an engine 110.

Regardless of how regeneration event requests are triggered, the regeneration event synchronization module 310 is configured to initiate regeneration events on both DPFs when regeneration of only one of the DPFs has been triggered. Accordingly, even if a regeneration event on a DPF has not been triggered (i.e., is not necessary), the regeneration event synchronization module 310 will nevertheless initiate a regeneration event on that DPF if a regeneration event is necessary on the other DPF. In this manner, the regeneration event synchronization module 310 ensures that regeneration events on the DPFs 140A, 140B is synchronized.

In one embodiment, the regeneration event synchronization module 310 initiates the regeneration events on the DPFs 140A, 140B by independently controlling the parameters (e.g., exhaust gas temperature and exhaust gas temperature rate of change) of the regeneration events. For example, the regeneration event synchronization module 310 independently increases at a desired rate the DPF inlet exhaust temperatures of the DPFs to respective target temperatures (e.g., exhaust gas regeneration temperatures) corresponding with the DPFs. The target exhaust temperatures are the exhaust temperatures necessary to perform a regeneration event on the DPFs. In some implementations, for example, the regeneration event synchronization module 310 is configured to determine a first DPF inlet exhaust gas temperature target for the DPF 140A based on the sensed pressure differential across the DPF 140A. Likewise, the regeneration event synchronization module 310 is configured to determine a second DPF inlet exhaust gas temperature target for the DPF 140B based on the sensed pressure differential across the DPF 140B. In other implementations, the DPF inlet exhaust gas temperature targets can be determined according to other methods, such as a predetermined look-up table. The first and second DPF inlet exhaust temperature targets, and associated rates of change, can be the same or different, but preferably are determined independent of each other.

Based on the first and second DPF inlet exhaust temperature targets and the sensed DPF inlet exhaust temperatures from the temperature sensors 146A, 146B, the regeneration event synchronization module 310 determines the exhaust temperature increase necessary to achieve the targets. Then, based on the determined exhaust temperature increase, as well as the desired exhaust temperature rate of change if applicable, the regeneration event synchronization module 310 calculates at least one of a drop in exhaust flow rate and an amount of reactant necessary to achieve the determined exhaust temperature increases and associated increase rate. Reducing the flow of exhaust gas to the DOCs 142A, 142B and DPFs and/or introducing the reactant into the exhaust gas may act to increase the temperature of exhaust gas flowing through the DPFs.

The reduction of exhaust flow can be accomplished by generating and transmitting engine commands 350 to one or more components of the engine 110. For example, in one implementation, the engine commands 350 can include an engine reduction command for reducing a speed of the engine, which can result in a reduced exhaust flow rate through the after-treatment system 120. In another implementation, the engine commands 350 can include an exhaust gas recirculation (EGR) valve command for redirecting a portion of exhaust away from the after-treatment system via an EGR valve. The engine commands 350 can include other engine component commands resulting in a reduction of the exhaust gas flow rate through the after-treatment system 100 as recognized by those of skill in the art in view of this disclosure. Additionally, in certain implementations, the change of exhaust flow rate through the respective DPFs can be accomplished via respective flow regulation valves. For example, a respective flow regulation valve can be placed within the exhaust gas distributor 116 to independently control the flow rate through the respective branches 122A, 122B.

The introduction of reactant into the exhaust gas can be accomplished by generating and transmitting at least one of an injection timing command 330 and a hydrocarbon or reactant doser command 340. The injection timing command 330 is transmitted to a fuel injection control unit of the engine 110 to modify the fuel injection timing and/or quantity of fuel injected into the combustion chamber of the engine. In some instances, the injection timing command 330 adjusts the fuel injection timing of the engine 110 to include one or more post-combustion fuel injections. The reactant doser command 340 is transmitted to the reactant pumps 164A, 164B and directs the pumps to deliver reactant to the reactant delivery mechanisms 166A, 166B. Additionally, the reactant doser command 340 is transmitted to the reactant delivery mechanisms 166A, 166B to inject selected amounts of reactant into the exhaust gas flowing through the inlets 126A, 126B. The amounts of reactant injected by the reactant delivery mechanisms 166A, 166B can be the same or different, but in either case are independently or separately controlled based on the desired parameters of the regeneration events on the respective DPFs 140A, 140B.

The regeneration event termination module 320 is configured to selectively and individually end the regeneration events on the DPFs 140A, 140B if predetermined conditions are met. In other words, after regeneration events have been synchronously initiated on the DPFs 140A, 140B by the regeneration event synchronization module 310, under normal operating conditions (e.g., when no faults associated with the regeneration events are detected), the regeneration event termination module 320 stops a regeneration event irrespective of whether the other has stopped. During the regeneration events, the regeneration event termination module 320 can continuously receive input from the differential pressure sensors 150A, 150B to continuously monitor the pressure difference across the DPFs. The regeneration event termination module 320 can be configured to stop a regeneration event if the pressure difference across the DPF falls below a threshold (i.e., the amount of particulate matter accumulated on the DPF has dropped below a threshold).

In alternative embodiments, the regeneration event termination module 320 can use particulate matter loading estimation techniques other than pressure differential techniques, such as particulate matter distribution and exhaust mass concentration techniques, to estimate the particulate matter accumulation on the DPF. In these embodiments, the regeneration event termination module 320 would be configured to stop a regeneration event if the estimated amount of particulate matter accumulated on the DPF has dropped below a threshold.

Based on the foregoing, the regeneration event termination module 320 stops a regeneration event on a DPF if further cleaning of the DPF is unnecessary (i.e., the DPF has been sufficiently cleaned by the regeneration event).

Figure 4:
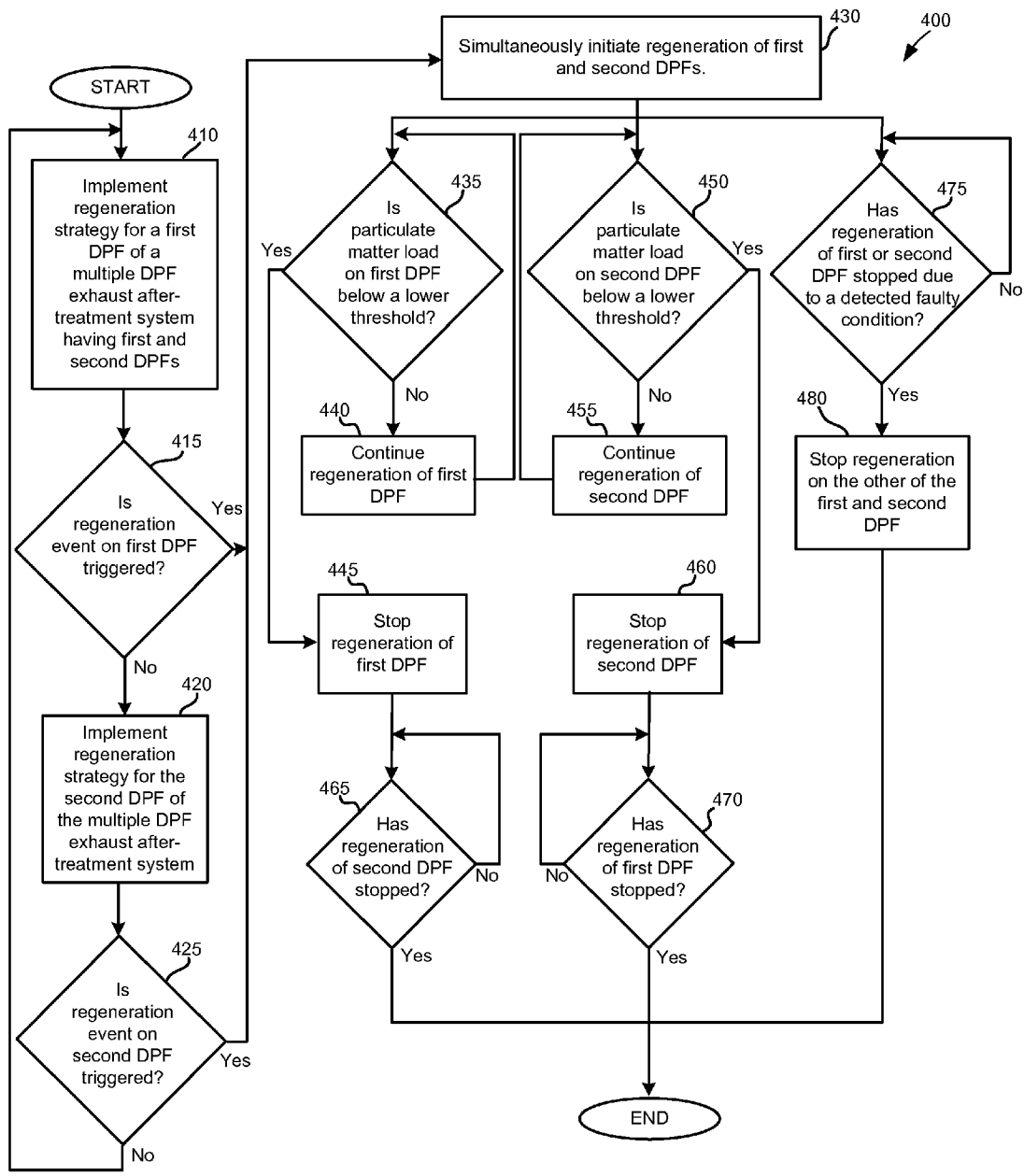
FIG. 4 is a flow chart diagram of a method for controlling regeneration events on multiple DPFs according to one representative embodiment.

FIG. 4 illustrates a method 400 for controlling regeneration events on multiple DPFs in a single engine system according to one embodiment. The method 400 substantially includes the actions to carry out the functions presented above with respect to the operation of the systems 100, 200 of FIGS. 1 and 2. The method 400 starts at 410 by implementing a regeneration strategy for a first DPF of a multiple DPF exhaust after-treatment system having first and second DPFs. Implementing the regeneration strategy can include estimating a first particulate matter load on a first DPF of a multiple DPF exhaust after-treatment system having first and second DPFs, such as, for example, exhaust after-treatment systems 120, 220 of FIGS. 1 and 2, respectively. In one implementation, the first and second particulate matter loads can be estimated by the particulate matter loading module 300. In other embodiments, implementing the regeneration strategy can include monitoring other operating conditions and driving conditions, and/or looking up predetermined regeneration timing schedules.

If the regeneration strategy has triggered a regeneration event on the first DPF as determined at 415, then the method 400 proceeds to initiate regeneration events on the first and second DPFs synchronously, e.g., simultaneously at 430. In certain implementations, initiation of regeneration events on the first and second DPFs can be controlled by the regeneration event synchronization module 310. If at 415, the regeneration strategy has not triggered a regeneration event on the first DPF, then the method 400 proceeds to implement a regeneration strategy for the second DPF of the multiple DPF exhaust after-treatment system at 420. If the regeneration strategy has triggered a regeneration event on the second DPF as determined at 425, then the method 400 proceeds to initiate regeneration events on the first and second DPFs synchronously, e.g., simultaneously, at 430. If at 425, regeneration strategy has not triggered a regeneration event on the second DPF, then the method 400 returns to action 410 to form a continuous loop.

Alternatively, in embodiments having more than two DPFs as discussed above, if a regeneration event has not been triggered on the second DPF, then the method 400 proceeds to continuously and consecutively implement regeneration strategies on any number of DPFs as long as the regeneration strategy of the precedent DPF has not triggered a regeneration event. However, as soon as the regeneration strategy of one DPF indicates a regeneration event has been triggered, then regeneration events are simultaneously initiated on all DPFs according to 430.

Once regeneration events have been synchronously initiated on the first and second DPFs at 430, the method 400 queries at 435, 450 whether the particulate matter loads on the first and second DPFs, respectively, are below predetermined lower thresholds. The determination of the particulate matter load on the first and second DPFs can be based on any of various estimation strategies, such as delta-pressure measurements across the DPFs, particulate matter distribution estimates, exhaust mass concentration formulas, and the like. If the particulate matter load on the first DPF is greater than or above the lower threshold (i.e., the determination at 440 is answered negatively), then the regeneration event on the first DPF continues at 440. Similar to the determination at 440, if the particulate matter load on the second DPF is greater than or above the lower threshold (i.e., the determination at 450 is answered negatively), then the regeneration event on the second DPF continues at 455. However, if the particulate matter load on the first DPF is below the lower threshold (i.e., the determination at 440 is answered positively), then the regeneration event on the first DPF is stopped at 445. Similarly, if the particulate matter load on the second DPF is below the lower threshold (i.e., the determination at 450 is answered positively), then the regeneration event on the second DPF is stopped at 460. It can be appreciated from the foregoing, that the method includes initialization of regenerations events on multiple DPFs at the same time, but includes stoppage of the respective regeneration events independent of each other based on independent determinations.

After regeneration of the first DPF has stopped at 445, the method determines at 465 whether regeneration of the second DPF has stopped. If regeneration of the second DPF has stopped, then the method 400 ends. However, if regeneration of the second DPF has not stopped, then the method 400 re-determines at 465 whether regeneration of the second DPF has stopped. The method 400 continuously checks the status of the regeneration event on the second DPF at 465 until regeneration of the second DPF ends. Similar to the determination made at 445, the method 400 determines at 470 whether regeneration of the first DPF has stopped. If regeneration of the first DPF has stopped, then the method 400 ends. Otherwise, the method 400 will continue to determine whether regeneration of the first DPF has not stopped until regeneration of the first DPF has stopped.

In certain implementations, the method 400 includes determining at 475 whether regeneration of the first or second DPF has stopped due to a detected faulty condition, such as sensor faults, reactant doser faults, plugging of the DOC inlet face, and the like. The method 400 continuously checks for regeneration event stoppage caused by a faulty condition. If regeneration of one of the first and second DPFs has stopped due to a faulty condition as determined at 475, then the other of the first and second DPF is stopped at 480 even if the regeneration event has not completed and the method 400 ends. For example, if the regeneration event on the first DPF has stopped because of a faulty sensor, then the regeneration event on the second DPF is stopped regardless of whether the regeneration event on the second DPF requires more time for completion. In this manner, soot loading discrepancies and out-of-sync regeneration events between multiple DPFs are reduced. In certain implementations, if the method 400 ends due to a regeneration event being stopped due to a faulty condition, the method is not re-implemented until the faulty condition is resolved.

It can be appreciated from the foregoing that the present disclosure provides a system, method, and apparatus for reducing engine thermal management requests, reducing particulate matter overloading and overcleaning of DPFs, reducing the amount of reactant used for DPF regeneration events, and reducing exhaust backpressure discrepancies between DPFs of exhaust-aftertreatment systems having multiple DPFs.

For implementing a regeneration event on a DPF, the controller requests thermal management from the engine. Thermal management includes increasing the exhaust gas temperature by recalibrating the operation of the engine. Often, thermal management of the engine results in excessive amounts of NO in the exhaust gas stream and inefficient performance of the engine. Accordingly, reducing engine thermal management requests to an engine is desirable. Independent initialization of regeneration events on multiple DPFs may result in regeneration events that are not synchronized because the particulate matter often accumulates unequally on DPFs of different branches. In other words, because particulate matter accumulates unequally on different DPFs, the regeneration events may occur at different times, which increases the total amount of time that an engine is being thermally managed. By synchronizing the initiation of regeneration events on multiple DPFs based on the most-loaded DPF and independently ending the regeneration events, the particulate matter loading and unloading cycles of the DPFs remain relatively synchronized and thus, the amount of time an engine is under thermal management is reduced. Additionally, because only the start of regeneration on multiple DPFs is synchronized, coordination between the DPFs is reduced, which may result in a reduction in software changes and updates over time.

As discussed above, all DPFs in the multiple DPF exhaust after-treatment system are forced to regenerate if only one of the DPFs requests regeneration. Accordingly, the DPFs do not overload with particulate matter. Similarly, after initialization, the DPFs end independently based on conditions local to the respective DPFs. Therefore, the DPFs are not over-regenerated or over-cleaned.

Once started, the characteristics of the regeneration events on the multiple DPFs are individually controlled according to conditions local to each DPF. For example, each DPF is associated with a separate reactant doser controlled to dose an amount of reactant specific to regeneration events on the associated DPF. Therefore, the amount of reactant dosed for each regeneration event is never excessive. Accordingly, the apparatus, system, and method described herein provides for a reduction in dosed reactant.

As discussed above, exhaust backpressure discrepancies can form between DPFs of a multiple DPF system. Backpressure can form due to part-to-part variability and particulate matter loading discrepancies between the DPFs. By synchronizing regeneration events on the DPFs as discussed above, the particulate matter loading discrepancies can be reduced to at least partially equalize the amount of particulate matter on the DPFs. The reduction in particulate matter loading discrepancies promotes a reduction in exhaust backpressure differences between the DPFs.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Modules may be implemented in a computer readable medium, which may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling regeneration events on multiple diesel particulate filters (DPFs) of an exhaust after-treatment system, comprising:
a particulate matter loading module configured to estimate a first amount of particulate matter on the first DPF and a second amount of particulate matter on the second DPF, wherein the particulate matter loading module triggers a regeneration event request for the first DPF if the first amount of particulate matter on the first DPF is above a first threshold and the second amount of particulate matter on the second DPF is below a second threshold, and triggers a regeneration event request for the second DPF if the first amount of particulate matter on the first DPF is below the first threshold and the second amount of particulate matter on the second DPF is above the second threshold;
a regeneration event synchronization module configured to simultaneously initiate a regeneration event on the first DPF and a regeneration event on the second DPF in response to a regeneration event request being triggered for one of the first or second DPFs; and
a regeneration event termination module configured to terminate the regeneration event on the first DPF and the regeneration event on the second DPF, wherein under normal operating conditions, the termination of the regeneration event on the first DPF is performed independently of the termination of the regeneration event on the second DPF;
wherein the particulate matter loading module, regeneration event synchronization module, and regeneration event termination module each comprises one or more of logic hardware and non-transitory machine-readable storage media having executable code stored thereon.

2. The apparatus of claim 1, wherein the regeneration event synchronization module is configured to control the parameters of the regeneration event on the first DPF independently of the parameters of the regeneration event on the second DPF.

3. The apparatus of claim 2, wherein the parameters of the regeneration event on the first DPF are different than the parameters of the regeneration event on the second DPF.

4. The apparatus of claim 2, wherein the parameters of the regeneration events on the first and second DPFs comprise exhaust gas regeneration temperature.

5. The apparatus of claim 1, wherein the regeneration event termination module is further configured to terminate the regeneration event on the first DPF substantially simultaneously with the termination of the second DPF under abnormal operating conditions.

6. An exhaust after-treatment system coupleable to an engine, comprising:
- at least a first branch communicable in exhaust receiving communication with an engine, the first branch comprising a first diesel particulate filter (DPF);
- at least a second branch communicable in exhaust receiving communication with the engine, the second branch comprising a second DPF and being in a parallel configuration with the first branch; and
- one or more of logic hardware and non-transitory machine-readable storage media having executable code stored thereon configured to
- synchronize the start of regeneration events on the first and second DPFs and not synchronize the termination of regeneration events on the first and second DPFs under normal operating conditions and
- synchronize the start of regeneration events on the first and second DPFs when either (i) a first amount of particulate matter on the first DPF meets a first regeneration threshold and a second amount of particulate matter on the second DPF does not meet a second regeneration threshold; or (ii) the first amount of particulate matter on the first DPF does not meet the first regeneration threshold and the second amount of particulate matter on the second DPF meets the second regeneration threshold.

7. The exhaust gas after-treatment system of claim 6, further comprising a single exhaust line communicable in exhaust receiving communication with the engine, wherein the first and second branch are communicable in exhaust receiving communication with the single exhaust line via an exhaust distributor.

8. The exhaust gas after-treatment system of claim 6, further comprising at least two exhaust lines each communicable in exhaust receiving communication with the engine, wherein the first and second branches are communicable in exhaust receiving communication with a respective one of the at least two exhaust lines.

9. The exhaust gas after-treatment system of claim 6, further comprising at least first and second reactant dosers each configured to supply reactant to exhaust gas in a respective one of the first and second branches, wherein the first and second reactant dosers are independently controllable relative to each other.

10. A method for controlling regeneration events, comprising:
- estimating a first amount of particulate matter on a first diesel particulate filter (DPF) of at least two DPFs and a second amount of particulate matter on a second DPF of at least two DPFs;
- simultaneously initiating respective regeneration events on the first and second DPFs in response to the first amount of particulate matter meeting a first regeneration threshold and the second amount of particulate matter not meeting a second regeneration threshold;
- simultaneously initiating respective regeneration events on the first and second DPFs in response to the first amount of particulate matter not meeting the first regeneration threshold and the second amount of particulate matter meeting the second regeneration threshold; and
- terminating the regeneration event on one of the at least two DPFs independently of the termination of the regeneration event on the other of the at least two DPFs under normal operating conditions.

11. The method of claim 10, further comprising:
- implementing a regeneration strategy for a first of the DPFs, wherein implementation the regeneration strategy for the first DPF either triggers a regeneration event request for regeneration of the first DPF or does not trigger a regeneration event request for regeneration of the first DPF; and
- implementing a regeneration strategy for a second of the DPFs, wherein implementation the regeneration strategy for the second DPF either triggers a regeneration event request for regeneration of the second DPF or does not trigger a regeneration event request for regeneration of the second DPF;
- wherein the regeneration strategy for the second DPF is implemented only if the regeneration strategy implemented for the first DPF does not trigger a regeneration event request for regeneration of the first DPF.

12. The method of claim 10, further comprising:
- determining particulate matter loads on each of the at least two DPFs following initiation of the regeneration events;
- stopping the regeneration event on a first of the at least two DPFs and continuing the regeneration event on a second of the at least two DPFs if the particulate matter load on the first DPF is below a first threshold and the particulate matter load on the second DPF is above a second threshold; and
- stopping the regeneration event on a second DPF and continuing the regeneration event on the first DPF if the particulate matter load on the second DPF is below the second threshold and the particulate matter load on the first DPF is above the first threshold.

13. The method of claim 10, further comprising terminating the regeneration event on a first of the at least two DPFs substantially simultaneously with the termination of a second of the at least two DPFs under abnormal operating conditions.

14. The method of claim 13, wherein the abnormal operating conditions comprises at least one faulty condition associated with the regeneration event on the second DPF, and wherein the regeneration event on the second DPF is terminated in view of the at least one faulty condition.

15. The method of claim 10, further comprising controlling the exhaust gas temperature during regeneration events on the at least two DPFs following initiation of the regeneration events, wherein control of the exhaust gas temperature for the regeneration event on a first of the at least two DPFs is independent of the control of the exhaust gas temperature for the regeneration event on a second of the at least two DPFs.

16. The method of claim 15, wherein independent control of the exhaust gas temperature comprises independent control of at least two reactant dosers each communicable in reactant supplying communication with exhaust gas upstream of a respective one of the DPFs.

17. The method of claim 15, wherein independent control of the exhaust gas temperature comprises independent control of flow rates of exhaust gas through respective exhaust lines each comprising a respective one of the at least two DPFs.

18. The method of claim 15, wherein the exhaust gas temperature for regeneration of the first DPF is different than the exhaust gas temperature for regeneration of the second DPF.

* * * * *